United States Patent [19]

Stewart et al.

[11] Patent Number: 5,142,921
[45] Date of Patent: Sep. 1, 1992

[54] FORCE BALANCE INSTRUMENT WITH ELECTROSTATIC CHARGE CONTROL

[75] Inventors: Robert E. Stewart, Woodland Hills; Keith O. Warren, Newbury Park, both of Calif.

[73] Assignee: Litton Systems, Inc., Beverly Hills, Calif.

[21] Appl. No.: 605,947

[22] Filed: Oct. 29, 1990

[51] Int. Cl.⁵ .................... G01D 3/06; G01P 15/13
[52] U.S. Cl. .................... 73/866.1; 73/517 B
[58] Field of Search .................... 73/866.1, 517 B, 701, 73/862.61

[56] References Cited

U.S. PATENT DOCUMENTS

| | | | |
|---|---|---|---|
| 3,226,981 | 1/1966 | Mullins et al. | 73/517 |
| 3,334,949 | 8/1967 | Atkinson | 310/90.5 |
| 3,683,402 | 8/1972 | Parnell | 321/660 X |
| 3,877,313 | 4/1975 | Ferriss | 73/516 R |
| 3,891,285 | 6/1975 | Atkinson | 310/905 |
| 4,009,607 | 3/1977 | Ficken | 73/517 B X |
| 4,345,474 | 8/1982 | Deval | 73/517 B |
| 4,422,335 | 12/1983 | Ohnesurge et al. | 73/701 X |
| 4,483,194 | 11/1984 | Rudolf | 73/517 R |
| 4,584,885 | 4/1986 | Cadwell | 73/517 B X |
| 4,654,582 | 3/1987 | Ito | 340/825.16 X |
| 4,679,434 | 7/1987 | Stewart | 73/517 B |
| 4,747,296 | 5/1988 | Feldon et al. | 73/4 R |
| 4,932,261 | 6/1990 | Henrion | 73/517 B |
| 4,941,354 | 7/1990 | Russell et al. | 73/517 B |
| 4,987,779 | 1/1991 | McBrien | 73/517 B |

OTHER PUBLICATIONS

Petersen, Kurt, et al., "Micromechanical Accelerometer Integrated with MOS Detection Circuit," Proceedings of International Electronic Devices Meeting (Dec., 1980) pp. 673–675.

*Primary Examiner*—Tom Noland
*Attorney, Agent, or Firm*—Poms, Smith, Lande & Rose

[57] ABSTRACT

A force balanced instrument, such as an accelerometer, employs a pendulous mass having combined electrostatic pickoff and forcing plates on opposite sides thereof. The plates provide a constant attractive force in successive periods acting alternatively on opposing sides of the sensitive element. Force balance is achieved by controlling the duty cycle so that the difference in duration between each of the parts of a full cycle is a linear measure of acceleration. Voltage on each of the forcing plates is sensed independently immediately after each is charged with a fixed charging pulse which provides a fixed force level over the duration of the part cycle. The two successive voltage samples are stored, and the difference between them integrated to control the duty cycle of a pulse width modulator, which itself controls the duration of application of the alternately directed forces applied by the respective plates to the pendulous mass.

32 Claims, 5 Drawing Sheets

FORCE BALANCE INSTRUMENT WITH ELECTROSTATIC CHARGE CONTROL

This invention was made with support under Contract No. FO4701-87-C-0065, awarded by the U.S. Air Force Space Division. The Government has certain rights in this invention.

BACKGROUND OF THE INVENTION

The present invention relates to force balanced instruments of the closed loop type, and more particularly concerns a force balanced instrument in which position of a sensing mass is capacitatively sensed and the mass is electrostatically forced toward a null position.

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

For example, in an electrostatic force balanced accelerometer of the type shown in U.S. Pat. No. 4,679,434, for Integrated Force Balanced Accelerometer, of Robert Stewart, electrostatic forcing in a closed loop system is employed to position and obtain an output from a pendulous inertial mass. The electrostatic forcing system employs a capacitive pickoff electrode on each side of a pendulous member that has been etched from a silicon substrate. The electrodes also apply nominally equal and opposite bias forces to the pendulous member to which is applied a control voltage. In another control arrangement for an accelerometer of this type, a fixed bias voltage and feedback voltage are applied concurrently to pickoff and forcing electrodes on opposite sides of the sensitive mass. The arrangement is such that a net force on the pendulous mass applied by this control system is the difference between the two forces, which is effectively proportional to the feedback voltages, because the fixed bias voltage is a constant.

This system has a number of problems, including the large negative spring effect associated with the required fixed bias electrical fields. Even in the absence of any input acceleration to be sensed, these bias fields are required, and, since the bias field may vary, the instrument may have poor null stability and poor repeatability. In such systems many factors, such as gap variation, aging of components, temperature variations, and the like provide sources of error that may result in spurious output and decreased null stability. Potentially this spurious bias error is a large error. Small variations in electric field are exacerbated by the large negative spring effect associated with voltage control in both parallel and non-parallel motion.

Accordingly, it is an object of the present invention to provide a force balanced instrument that avoids or minimizes above mentioned problems.

SUMMARY OF THE INVENTION

In carrying out principles of the present invention in accordance with a preferred embodiment thereof, position of the sensing member of a force balanced sensing instrument is controlled by generating a pickoff signal indicative of displacement of the sensing member from a null position, repetitively applying to the sensing member a constant magnitude force, independent of displacement of the sensing member, alternately for first and second periods of time in respectively opposite directions. The first and second time periods are varied in response to the pickoff signal so as to effect a difference in the first and second periods that results in a net force on the sensing member equal and opposite to the applied inertial force, thereby maintaining the pickoff at null. Thus, the difference between the periods is a linear measure of acceleration of an accelerometer proof mass.

According to a feature of the invention, first and second electrostatic plates mounted on opposite sides of a movable sensing member cooperate with the sensing member to form first and second capacitors respectively that vary oppositely as the member moves in response to an input that is to be sensed. Equal charges are applied to the first and second capacitors for successive time intervals to establish first and second voltages on the respective capacitors which force the sensing member toward null position. The difference between the voltages on the capacitors in successive time intervals indicates the displacement of the sensing member and may be employed to control the durations of respective ones of the time intervals so as to move the sensing member toward a null position. Effectively, the system generates its pickoff signal by sensing the voltages that are associated with the capacitor forcing charges.

DETAILED DESCRIPTION OF THE INVENTION

Figure 1:
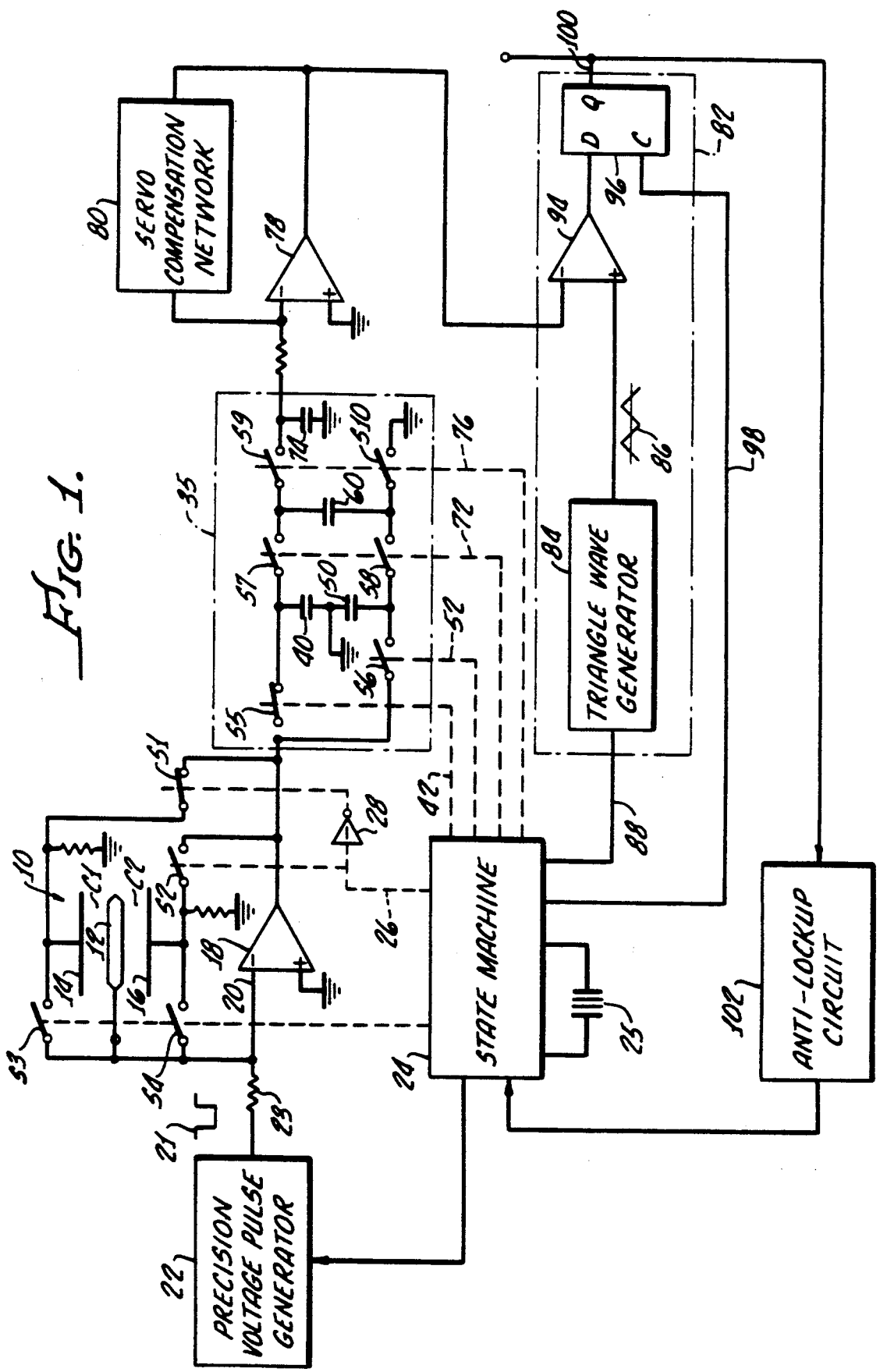
FIG. 1 is a block diagram of a force balanced sensing instrument employing principles of the present invention.

Schematically and functionally illustrated in FIG. 1 is an accelerometer, generally indicated at 10, which may be of the type described in U.S. Pat. No. 4,679,434. The accelerometer includes a pendulous mass 12 and a pair of electrostatic plates or electrodes 14, 16 positioned close to but slightly spaced from and on opposite sides of the mass 12. Electrostatic plates 14, 16 form pickoff and forcing plates. As described in detail in U.S. Pat. No. 4,679,434, the instrument comprises a central inertial mass that is etched from a semi-conductor substrate, such as silicon. The inertial mass is attached to the substrate by hinges, all of which are formed by anisotropic etching of the single crystal silicon so that the mass is connected to the substrate in a cantilevered arrangement to deflect about an instrument output axis in response to acceleration along the input axis. The inertial mass is provided with electrically conductive surfaces on opposite sides thereof which are adjacent to but spaced along the input axis from electrically conductive surfaces of plates 14, 16. In a three axis inertial measurement unit, three or more accelerometers of the type illustrated in U.S. Pat. No. 4,679,434, or equivalent instruments may be employed.

According to the present invention, force balanced control of the position of pendulous mass 12 is provided by a method that controls charge on the capacitor plates and causes the plates to simultaneously act as both pickoff and forcer elements. The arrangement eliminates both the need for a separate pickoff excitation source and the negative electrostatic spring effect associated with the prior voltage control systems for parallel plate motion and significantly reduces the effect for non-parallel plate motion. Moreover, the method employs a pulse width modulated rebalance implementation that provides a digital output capability and improved linearity.

In general, the instrument is operated by repetitively applying a constant attractive force, acting alternately on opposing sides of the sensing mass. That is, a fixed force is applied first to one side for a part of a cycle and then a force of the same magnitude is applied to the other side for the remainder of the cycle, and the cycle is continuously repeated. For parallel plates, the force is independent of the displacement of the sensing mass. The fixed force is applied to one side or the other for varying intervals. The relative lengths of successive intervals are determined by the magnitude of acceleration experienced by the sensing mass. The relative lengths of the successive intervals or part cycles of application of force to alternatively opposite sides of the pendulous mass are controlled by varying the duty cycle of a periodic wave, such as a square wave. Thus, if the duty cycle is fifty percent, equal and opposite forces are applied to the pendulum for equal periods of time, and the average value of the resultant force on the sensing mass is zero. The difference in duration between the two portions of a single cycle is a linear measure of acceleration. The period of this difference can be used to gate clock pulses that are readily interpreted as velocity increments, thereby providing a digital output.

Referring again to FIG. 1, the plates 14, 16 cooperate with pendulous mass 12 to form capacitors C1 and C2. The two capacitors are connected in two parallel feedback paths of an operational amplifier 18 that operates as a charge integrator. A first feedback path runs from the amplifier output through a first switch S1, through capacitor C1, to the amplifier inverting input at point 20. A second feedback path includes a switch S2 and capacitor C2, also connected to the input of the amplifier at point 20. These switches may be field effect transistors or other semiconductor switching elements.

Capacitor discharging or reset switches S3 and S4 are connected across the respective capacitors C1, C2 for the purpose of momentarily discharging these capacitors just before each is charged. A precision voltage pulse generator 22 includes a voltage reference that feeds a voltage pulse 21 of precisely controlled voltage and duration through a resistor 23 to the input of amplifier 18 when one or the other of switches S1, S2 is closed. Switches S1 and S2 are closed alternatively by signals from a state machine 24 which provides timing signals for the system, including pulse generator 22, under control of a 10 MHz crystal 25. Plate select timing signals are fed via a line 26 directly to S2 and, via an invertor 28, to S1 to insure that only one of the capacitors is charged at a time.

The discharge switches S3 and S4 are operated simultaneously for a short period of time, as indicated by pulse 30 (FIG. 2), beginning at a time $t_1$, which is the rise time of a duty cycle controlling square wave signal 32. Pulse 30 terminates at time $t_2$. The timing of the circuit allows a short period, such as 2.6 microseconds for example, for the interval between $t_2$ and $t_3$ to allow transition voltages to settle, and at time $t_3$ applies the voltage charge pulse 21 of $-2.5$ volts with a duration of 3.2 microseconds to the input of the amplifier 18. The charging pulse is applied to capacitor C1 through closed switch S1. Switch S2 is open at this time. Switch S1 stays closed until the next reset time. The voltage on plate 14, indicated at 36 in the synchro-graph of FIG. 2, begins to ramp up at $t_3$. At time $t_4$, upon termination of the charge pulse 21, the voltage on plate 14 remains fixed until subsequent discharge is accomplished (assuming no displacement of the mass).

A differential sample and hold circuit, generally indicated at 35, alternately samples and stores voltage on plates 14 and 16, respectively, in a first sampler stage, and transfers each pair of samples to a differencing stage of the sampler. The second stage of the sampler performs a differencing function since each end of its storage capacitor is alternately referred to ground while being charged by the previously sampled plate voltages. In this way, very high common mode rejection is achieved, and the second sample stage capacitor will be charged to a voltage representing the difference between the two plate voltages. The voltage on this capacitor indicates deviation of the pendulum from the centerline between the two plates. The third sampler stage transfers this differential second stage voltage to another capacitor referred to ground so that a single-ended signal results. This signal is buffered, amplified, and connected to an integrator stage with a "bridged T" servo compensation circuit.

Details of the differential sample and hold circuit are illustrated within dotted box 35 of FIG. 1. The charge on capacitor C1 remains to provide an input to amplifier 18. In the sample and hold circuit 35, the amplifier output is sampled by closing a switch S5 connected between the amplifier output and a top plate storage or sample device, capacitor 40. Closing of sampling switch S5, under control of a timing signal on a line 42 from state machine 24, occurs at time $t_5$ (FIG. 2), which is the time of initiation of a sample pulse 44 for sampling plate 14.

At the end of the first part cycle of the duty cycle of control square wave 32, which occurs at time $t_6$, switches S3 and S4 are momentarily closed to again discharge both capacitors, and shortly thereafter, between times $t_7$ and $t_8$, switch S2 is closed, and pulse generator 22 provides a precision voltage pulse 21 to capacitor C2. At the beginning of charging pulse 21 of this part cycle capacitor C2 begins to charge up as indicated at wave form 48 of FIG. 2 to a voltage level determined by the charge pulse applied from the output of amplifier 18 and the capacitor gap. The capacitor voltage remains at this level (again assuming no displacement of mass 12) until the end of this second part cycle of the duty cycle controlling square wave which occurs at time $t_{10}$.

Shortly after time $t_8$ when the lower plate 16 has been fully charged, a second sample switch S6 is momentarily closed to store the voltage on the lower plate 16 of capacitor C2 in a second sample storage capacitor 50. Switch S6 is closed under control of a timing signal on a line 52 from the state machine 24. This sampling of voltage on plate 16 begins at a time $t_9$ shortly after the termination of the charging pulse for capacitor C2. Sampling of voltage on plate 14 is effected by sampling the output of amplifier 18 while capacitor C1 is charged and while capacitor C2 is discharged. Similarly, voltage on plate 16 is sampled by sampling the output of amplifier 18, as indicated by pulse 45 of FIG. 2, in the second part of the cycle, after both capacitors C1 and C2 have been 35 discharged (at $t_6$) and after capacitor C2 has been charged ($t_8$).

Figure 2:
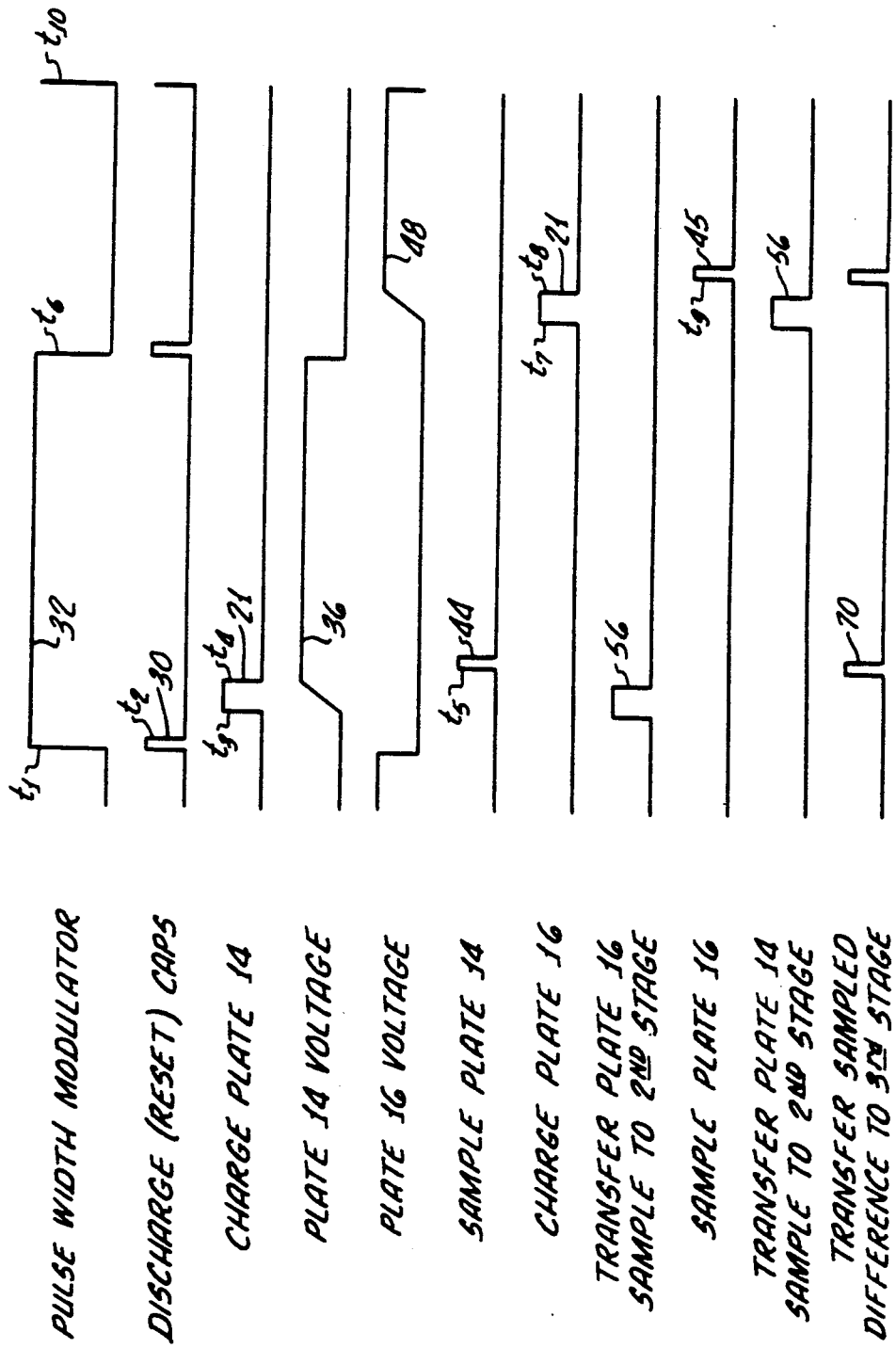
FIG. 2 is a synchro-graph illustrating timing of various operations of the system of FIG. 1.

During the charging of capacitor C1, second sampler stage switches S7 and S8 are closed simultaneously, as indicated by pulse 56 of FIG. 2, to transfer the stored voltages of plate 14, capacitor C1, and plate 16, capacitor C2, to opposite sides of a capacitor 60, which forms the sampler difference storage stage. Switches S7 and S8 are closed by a timing pulse on a line 72 from the state machine.

Accordingly, difference stage capacitor 60 stores a signal proportional to the difference between voltage on capacitor C1 when it was charged and the voltage on capacitor C2 when it was charged.

From the preceding description it will be seen that a precision pulse applied to charge integrator input 20 causes a known current to flow into the integrator for a precise and known time duration. This pulse alternately establishes a charge on each plate which causes the plate to remain at a voltage determined by the quantity of charge injected and the capacitance between the sensing mass and the respective plate. The charge injected to each plate remains constant from cycle to cycle, and, therefore, the voltage of the capacitor is a function only of the accelerometer plate capacitance, which in turn varies as the sensing mass 12 is displaced. Accordingly, the voltage on each capacitor C1, C2 is a function of accelerometer sensing mass displacement and is used to indicate sensing member position. However, the charge is applied to only one plate at time, and thus the plate voltages are sampled, then differenced to provide the pickoff signal as the difference between the sampled voltages.

As described above, the stored samples are sent to the difference sample capacitor 60, which accordingly stores a signal representative of sensing member displacement. The difference signal is sent at times indicated by pulse 70 of FIG. 2 to the third sample stage capacitor 74 via switches S9, S10, which are simultaneously closed by a timing signal on a line 76 from the state machine. The difference signal from capacitor 74 is fed to an integrating amplifier 78 at the output of which appears an analog output representing the force required to keep the pendulum at null position. Integrating amplifier 78 is provided with a servo compensation network 80 between its output and input. The output of integrating amplifier 78 is fed to a pulse width modulation circuit indicated in dotted box 82, which provides the variable duty cycle controlling square wave 32. The duty cycle of square wave 32 is varied in accordance with the pickoff signal from the integrator amplifier 78.

Pulse width modulation circuit 82 comprises a triangle wave generator 84 that produces a triangle wave 86 under control of a 10 khz clock signal received on a line 88 from the state machine 24. The triangle wave 86 is compared with the position pickoff signal from the output of integrating amplifier integrator 78 in a comparator formed by an operational amplifier 94 that receives the triangle wave 86 and pickoff signal at its inverting and non-inverting inputs respectively. The comparator output is used to trigger a flip flop 96 which is clocked by a 2.5 MHz clock signal supplied on a line 98 from the state machine. The output of the flip flop, on a line 100, provides the pulse width modulated signal 32 (FIG. 2) and is fed through an anti-lockup circuit 102 to the state machine. This signal 32 is effectively quantitized because of the clock input to flip flop on line 98. Anti-lockup circuit 102 is comprised of a pair of flip flops (not shown) connected to have mutually exclusive states so as to prevent high frequency comparator oscillations or a start up state from retriggering the state machine until it completes at least a minimum cycle.

Figure 3:
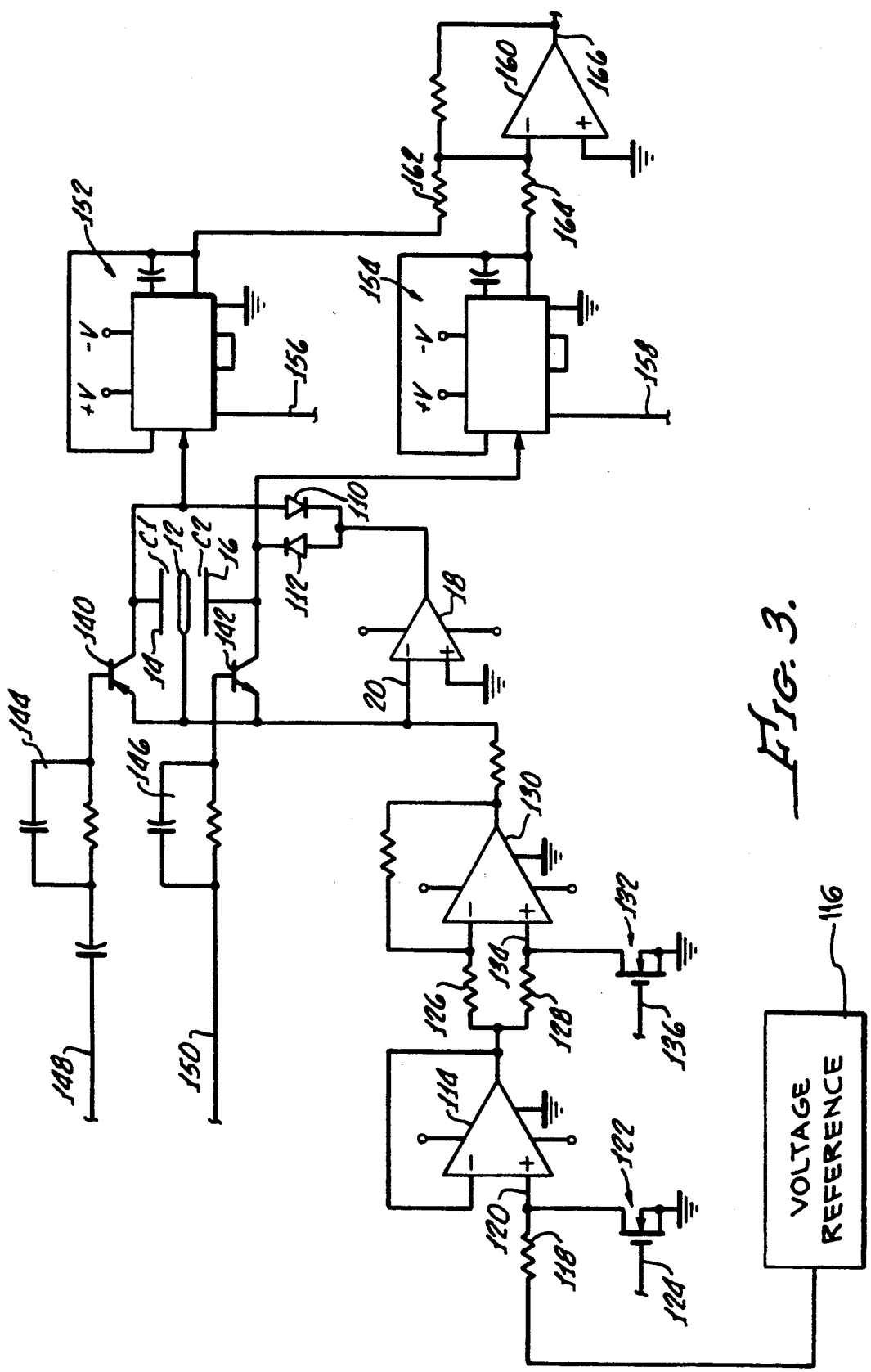
FIG. 3 illustrates a modification of the circuitry of FIG. 1.

Illustrated in FIG. 3 are portions of a circuit for providing electrostatic forcing and voltage pickoff, as in the arrangement of FIG. 1, but utilizing passive switches, (e.g. diode steering) for charging the capacitive plates of the sensing mass. As shown in FIG. 3, the sensing mass 12 and plates 14, 16 forming capacitors C1 and C2 respectively, are the same as illustrated in FIG. 1 and previously described. In this case the constant current source provided by the integrating amplifier 18 receives precision voltage pulses at its inverting terminal 20 which are alternately positive and negative, but of the same amplitude. Thus, instead of employing series switches to steer the charging current pulse from the integrating amplifier 18 to the respective plates 14, 16, diodes 110 and 112 are employed, respectively coupled in the feedback paths from the output of amplifier 18 through the capacitors C1 and C2 back to input terminal 20 of the amplifier. This arrangement avoids problems, such as stray capacitances, that may be introduced by presence of switches S1 and S2 in series with the capacitors C1 and C2. Spurious charge that would be introduced by active series switches, as when they are turned on, is avoided by use of the passive steering diodes.

To provide a bipolar precision voltage pulse to the integrating amplifier 18 there is employed an operational amplifier 114 having a feedback from its output to its inverting input and having a precision constant voltage input to its non-inverting input provided from a voltage reference 116 via a precision resistor 118. The non-inverting input terminal 120 of amplifier 114 is normally held to ground by a MOSFET transistor 122 which has its gate controlled by a signal on a line 124 from the state machine (not shown in FIG. 3) which provides overall timing signals for the several elements as previously described in connection with the embodiment of FIG. 1. Transistor 122, when momentarily turned off for generation of a charging pulse, effectively provides a positive going pulse at the non-inverting input to amplifier 114 and a positive going voltage pulse at its output which is applied via resistors 126, 128 to both inverting and non-inverting inputs of an operational amplifier 130. A MOSFET transistor 132 has its drain connected to the non-inverting input 134 of amplifier 130 and its gate controlled by a signal on a line 136 from the state machine. When the transistor 132 is turned on the non-inverting input 134 of amplifier 130 is pulled to ground and the amplifier acts as an invertor, providing a negative going pulse at its output. When transistor 132 is off amplifier 130 acts as a follower to provide a positive going output pulse. These pulses of opposite polarity are provided for the respective alternate charge times of capacitors C1 and C2 according to the signal on line 136 provided by the state machine. When a negative precision pulse is provided at the output of amplifier 18, capacitor C1 is charged through diode 110, and when the positive charge is provided at the amplifier output the capacitor C2 is charged through diode 112. Opposite polarity PNP and NPN transistors 140 and 142 respectively are connected across the respective capacitors C1 and C2 and receive discharge timing signals via RC networks 144, 146 on lines 148 and 150, respectively, from the state machine. Thus, the accelerometer capacitors are discharged, as previously described in connection with FIG. 1. In this case, however, opposite polarity transistors are required because of the opposite polarity charges applied to the respective capacitors.

Standard sample and hold circuits 152 and 154 have inputs respectively connected to plate 14 of capacitor C1 and plate 16 of capacitor C2. The sample and hold circuits are respectively triggered by sample timing signals received on line 156 and 158, respectively, from the state machine. The sample and hold circuit 152 samples and stores the negative voltage on plate 14, while the positive voltage on plate 16 is sampled and stored by circuit 154. Outputs of the two sample and hold circuits are summed in a summing amplifier 160, having a resistive summing network 162, 164 at its inverting input terminal. Summing of the two opposite polarity voltages provides an effective substraction of the two magnitudes to yield the pickoff signal at output terminal 166 of amplifier 160, which is fed to the servo compensation amplifier 178 of FIG. 1 and to the pulse width modulator arrangement illustrated in dotted box 82 of FIG. 1. The use of standard sample and hold circuits receiving and sampling opposite polarity plate voltages allows the use of the summing amplifier 160 with its input referred to ground, thereby avoiding common mode voltage errors that may be present in a differential amplifier.

Figure 4:
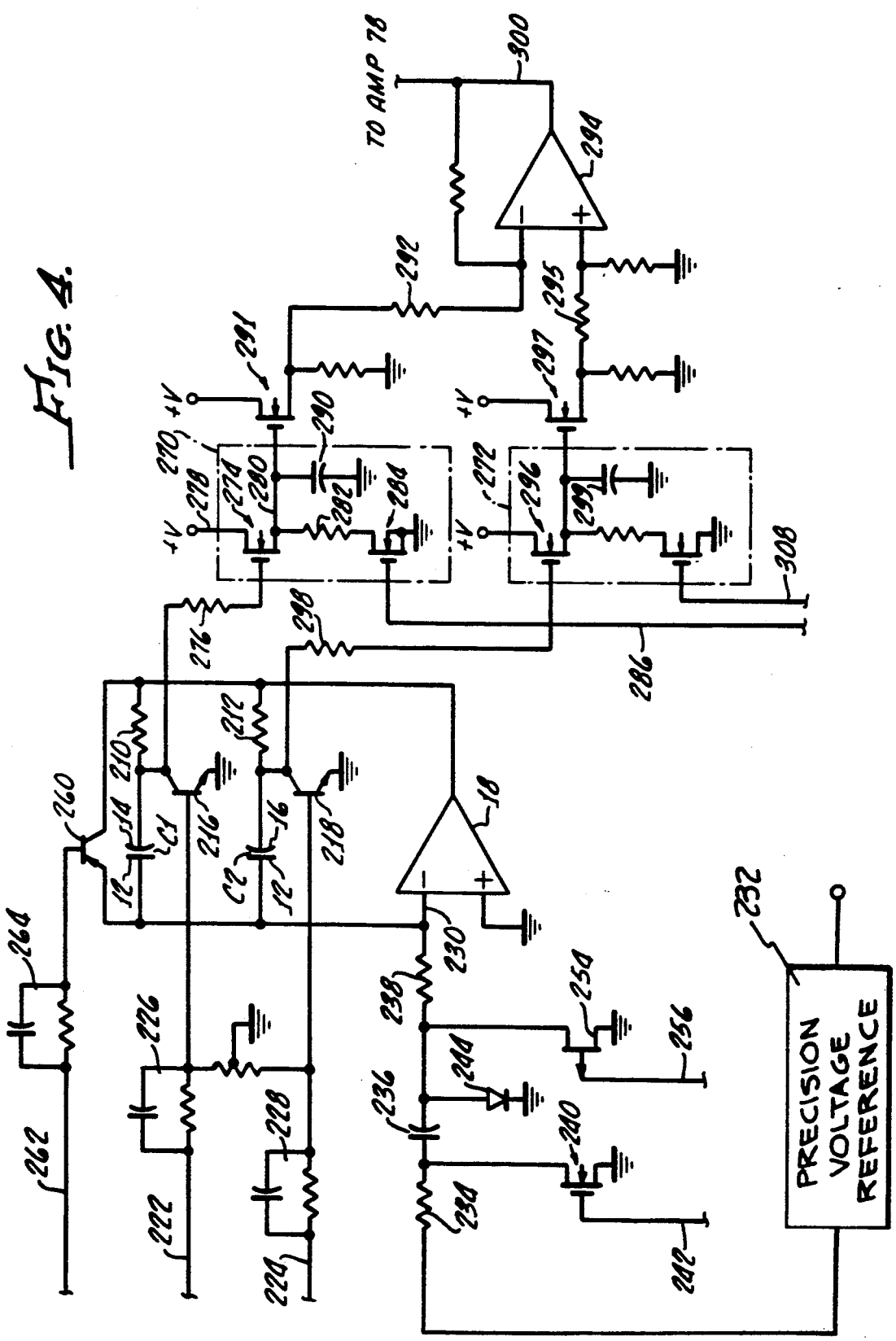
FIG. 4 illustrates still another modification of the circuitry of FIG. 1.

Still another arrangement presently preferred for charging the accelerometer capacitors and sensing the pickoff voltage is illustrated in FIG. 4. In the arrangement of FIG. 4, like the arrangement of FIG. 1, only a single polarity charging pulse is employed. Only one reset switch is needed, and steering switches for the capacitors are referred to ground.

In FIG. 4 the accelerometer capacitors are again indicated as C1 and C2, having plates 14 and 16 adjacent a pendulous mass, which in this FIG. is shown as a plate 12 common to both capacitors C1 and C2. The two separately shown but electrically connected plates 12 represent the sensing mass which, as previously described, is positioned between the two capacitative plates 14 and 16. Integrating amplifier 18, as in the other embodiments, provides a constant magnitude charging current for a fixed time. In this case the current is of a single polarity for charging both of the capacitors, which are again connected, as in both previously described embodiments, in separate but parallel feedback paths between the output and input of the integrating amplifier 18. Each of the feedback paths includes a resistor, such as resistor 210 and 212, connected in series between the amplifier output and a respective one of capacitor plates 14 and 16. Steering transistors 216, 218 of the same polarity type have their emitters connected to ground and their collectors respectively connected to the junctions of the capacitor plates 14, 16 and the respective resistors 210, 212. Accordingly, when either transistor 216 or 218 is turned on the associated capacitor of the accelerometer has its plate grounded. The transistors are turned on for the alternate charging times of the respective capacitors by appropriate timing signals fed from the state machine (not shown in FIG. 4) on lines 222, 224 through current limiting RC networks 226, 228.

Figure 5:
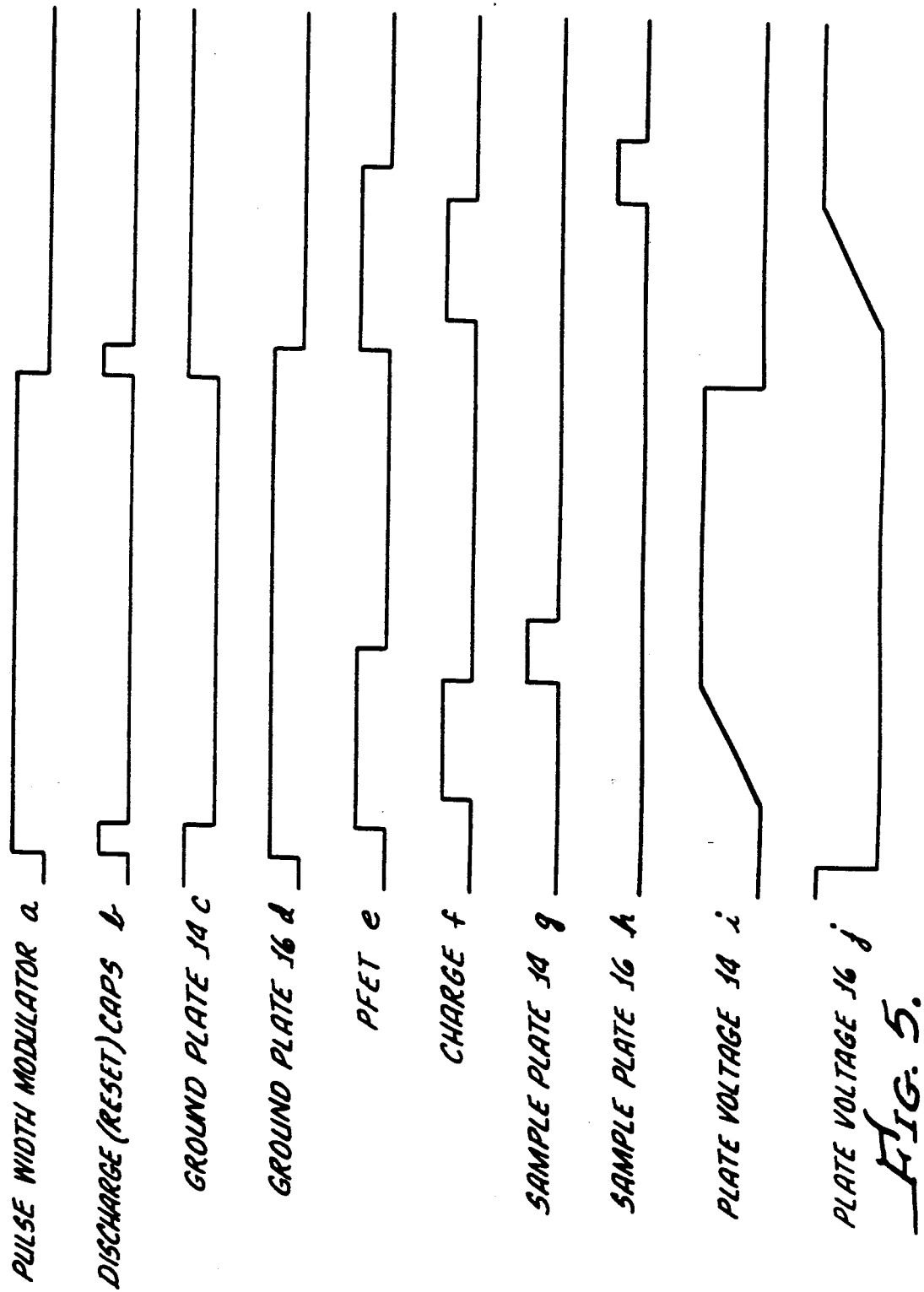
FIG. 5 is a timing chart for the circuit of FIG. 4.

A timing chart related to the circuit of FIG. 4 is shown in FIG. 5 and may be useful in following this description of the circuit. The timing chart is described further below.

A precision fixed value voltage pulse of precise duration is applied to the inverting input terminal 230 of amplifier 18 by a circuit including a precision voltage reference 232, which feeds a precision fixed level voltage pulse via a resistor 234, a capacitor 236 and an amplifier input resistor 238 to the input of amplifier 18. A MOSFET transistor 240, having its gate controlled by a timing signal on a line 242 from the state machine, is momentarily turned on to pull down the junction of resistor 234 and capacitor 236 to provide a negative going voltage pulse during the charging pulse time. Because a positive going ramp for the charging pulse is desired at the output of integrating amplifier 18, it is necessary to change the voltage pulse input from ground to a negative, such as −10 volts. Accordingly, a diode 244 is provided, having its cathode connected to ground and its anode connected to the junction of capacitor 236 and resistor 238. Thus, a negative going pulse, varying between 10 volts and ground at the junction of resistor 234 and capacitor 236, is passed as a pulse at the amplifier input that varies between ground and −10 volts. This pulse is generated by the MOSFET 240, which is momentarily turned on by the control signal on line 242 from the state machine to pull the junction of resistor 234 and capacitor 236 to ground. Because the duration of the pulse is much less than the time constant of resistor 234 and capacitor 236, this negative going pulse is transmitted through the capacitor and is level shifted to vary between ground and −10 by the action of diode 244.

The diode 244 may allow the pulse transmitted through the capacitor 236 to rise slightly above ground. Therefore, a transistor switch, such as a PFET 254 is connected between ground and the junction of capacitor 236 and input resistor 238. The control electrode of the PFET 254 is connected to a line 256 that sends a timing signal from the state machine to hold the junction of the capacitor 236 and resistor 238 at ground (the PFET is on), except when the desired voltage pulse occurs. Thus, PFET 254 is normally on, to ground this junction, but is turned off a very short time before occurrence of the pulse to allow the negative going pulse to pass. The PFET is again turned on a very short time after the termination of the voltage pulse, thereby ensuring a ground potential at the amplifier input 230 in the absence of the voltage pulse.

The negative voltage pulse provides a positive going ramp at the output of amplifier 18. Steering transistors 216, 218 of the accelerometer capacitors, when turned on, will ground the plates 14, 16. Just before capacitor C1 is to be charged, its steering transistor 216, which had been in a conducting state, is turned off to terminate the grounding of plate 14 and to allow the charging current from the amplifier 18 to charge capacitor C1. This causes the voltage on the capacitor to ramp up to the selected value during the charging time. While the capacitor C1 is being charged steering transistor 218 of capacitor C2 is in a conducting state to ground plate 16 of this capacitor so that the current flowing from the output of amplifier 18 will in part flow through the resistor 212 and transistor 218 to ground, thereby not affecting the feedback current through the charging capacitor C1. Conversely, just before capacitor C2 is to be charged its conducting transistor 218 is turned off, and transistor 216 is conducting to ground capacitor C1. Transistor 218 remains off until after the charging pulse period has terminated and a sample has been taken. Similarly, when charging capacitor C2, its transistor 218 remains off until after the charge time has been completed and a sample has been taken. Transistors 216 and 218 are switched on and off in mutually exclusive states, although, if deemed necessary or desirable, both may be on for the very short periods prior to initiation of each charging pulse and during the reset pulse (see FIG. 5). Reset (discharge) of both capacitors C1 and C2 is provided simultaneously by a single transistor 260 that is connected across both of the capacitors C1 and C2 and operated by a reset timing signal on a line 262 from the state machine fed through a current limiting RC circuit 264. Preferably the very short reset pulse is provided at the initiation of each part cycle of the pulse width modulated wave form from the circuit 98 of FIG. 1.

In order to generate the pickoff signal, charges on the two capacitors C1 and C2 are sampled by sample and hold circuits generally indicated in dotted boxes 270 and 272, respectively. The two circuits are identical, and only one need be explained. A source follower in the form of a MOSFET 274 has its gate connected via a resistor 276 to plate 14 of capacitor C1. Its drain 278 is connected to a suitable source of positive potential and its source 280 is connected via a resistor 282 to the drain electrode of a controlling MOSFET 284 having its source grounded. The gate of controlling MOSFET 284 is connected to receive a timing signal on a line 286 from the state machine to control the sample time and interval. The source of MOSFET 274 is connected to one side of a storage capacitor 290, having its other side grounded. Resistor 276, together with the input capacitance of the MOSFET 274 forms an RC circuit which limits any possible spike that might be present. When MOSFET 284 is turned on the source of MOSFET 274 is grounded through resistor 282 and the MOSFET 284, and it acts as a source follower to transfer the voltage on capacitor C1 to the storage capacitor 290. In this condition the source of transistor 274 tracks its gate by the gate to source threshold of transistor 274. When MOSFET 284 is off, no current flows, and storage capacitor 290 is isolated, to thereby retain its charge. Controlling MOSFET 284 is turned on solely during the desired sampling time. The signal stored on capacitor 290 is fed through a MOSFET 291 that provides a low impedance source to the inverting input of a differential amplifier 294.

The second sample and hold circuit 272 is identical to the first. It samples and holds the voltage on capacitor C2, feeding the sampled voltage via a MOSFET 296 and a resistor 298 to a storage capacitor 299, and thence, via a MOSFET 297 and a resistor 295, to the non-inverting input of differential amplifier 294. The output of differential amplifier 294, on a line 300, is fed to an amplifier and remaining circuit which may be identical to amplifier 78 and related circuitry shown in FIG. 1. Sample and hold circuit 296 is controlled by a sample timing pulse provided on a line 308 from the state machine.

An important advantage of the circuit illustrated in FIG. 4 is the fact that there are no switching transistors in series with the output of the integrating amplifier and the capacitors C1 and C2. Further, only one discharging transistor 260 is needed, thus eliminating the problems of different stray capacitances and matching of the transistors. Further, an improved circuit is employed for generating the voltage pulse applied to the integrating amplifier, and simplified sample and hold circuits are employed.

FIG. 5 is a timing chart illustrating timing of certain control functions of the circuit of FIG. 4. The first line in FIG. 5, line (a), shows the timing of the pulse width modulator output. The next line (b), labelled Discharge (reset), illustrates the time of occurrence and relative duration of the reset pulse applied to the discharging transistor 260. The next two lines (c), (d), labelled as ground of plate 14 and ground of plate 16, show the times of the grounding of these plates by the conduction of their respective steering transistors. Control of the PFET 254, shown in line (e), brackets the charging time shown in the next line (f). Sampling times for switches 1 and 2, namely MOSFET 284 and the corresponding MOSFET of sample and hold network 272, are shown in lines (g) and (h) and the voltages on the respective plates 14 and 16 are shown in lines (i) and (j). The durations of the reset pulse and charging time periods and sampling pulses may be substantially the same as stated in connection with the first described embodiment of FIG. 1.

Thus, it will be seen that no fixed bias (with its resulting negative electrostatic spring effect) is needed or employed because the force balance is achieved by controlling the duty cycle. The pulse width modulated square wave 32, has a difference in its part periods that is a linear measure of acceleration and can be used to gate clock pulses to provide a quantitized digital output.

Another significant advantage of the described system is the fact that the capacitor plates to which are applied fixed charges for selected periods of time perform a dual role. The accumulated charge applied to the capacitors C1 and C2 establishes a net applied force on the pendulum that is independent of gap or sensing member position. On the other hand, the voltage attained is a measure of the gap, and the voltage difference between the opposing plates is therefore used as the pickoff signal for the force rebalance servoing of the system. Accordingly, there is no need for a separate pickoff excitation supply.

We claim:

1. For use with a forced balanced instrument having a sensing member which is displaced from a null position in response to an input condition to be measured, and first and second electrostatic plates mounted adjacent to and on opposite sides of said sensing member and cooperating with said sensing member to form first and second capacitors, a method of controlling position of said sensing member comprising the steps of:
   generating a pickoff signal indicative of displacement of said sensing member from a said null position;
   repetitively applying to said sensing member a constant magnitude force, independent of displacement of said sensing member, alternately for first and second periods of time to respectively opposite sides of said sensing member in respective ones of first and second opposite directions; and
   varying said first and second periods of time in response to said pickoff signal and to effect a difference in said first and second periods that is indicative of said input condition.

2. The method of claim 1 wherein said steps of generating a pickoff signal and repetitively applying a constant magnitude force include the step of alternately applying a fixed charge to said first and second capacitors.

3. The method of claim 2, wherein said step of alternately applying a fixed charge include the steps of:
providing an integrating amplifier having an input and an output;
applying a series of voltage pulses to said amplifier input;
connecting said first and second capacitors in first and second feedback paths from said output to said input of said integrating amplifier;
establishing a control signal with a repetitive cycle having first and second varying part cycles to provide the control signal with a varying duty cycle;
charging said first and second capacitors alternately with a fixed charge during said first and second part cycles;
sampling voltage across respective ones of said first and second capacitors to provide first and second voltage samples;
integrating the different between said first and second voltage samples over a number of repetitions of said control signal to provide a pickoff signal; and
employing said pickoff signal to control said duty cycle.

4. The method of claim 3 including the step of discharging each capacitor before it is charged.

5. The method of claim 3 wherein said step of charging said first and second capacitors comprises providing first and second oppositely poled unidirectional devices in said first and second feedback paths, and applying successive pulses of opposite polarity to said integrating amplifier input.

6. The method of claim 3 wherein said step of charging said first and second capacitors alternately comprises the steps of alternately grounding one side of respective ones of said first and second capacitors.

7. The method of claim 2 wherein said step of alternately applying a fixed charge to said first and second capacitors comprise the steps of alternately applying charges of opposite polarity but equal amplitude to said first and second capacitors respectively.

8. The method of claim 2 wherein said step of alternately applying a fixed charge to said first and second capacitors comprises applying a fixed charge in common to both of said capacitors and alternately grounding respective ones of said capacitors, whereby only one of the capacitors is charged at a time.

9. The method of claim 1 wherein said step of repetitively applying a constant magnitude force comprises repetitively applying a fixed charge to alternate ones of said capacitors.

10. The method of claim 9 wherein said step of generating a pickoff signal comprises the steps of alternately sensing voltage across said first and second capacitors.

11. The method of claim 10 including the steps of temporarily storing samples of individual ones of said sensed voltages and generating said pickoff signal in accordance with the difference between successive ones of said stored samples.

12. The method of claim 11 including the step of integrating the difference between said successive ones of said stored samples, generating a pulse width modulated control signal having a duty cycle that varies in accordance with the integral of said pickoff signal, and employing said pulse width modulated control signal to control said first and second periods of time.

13. The method of claim 1, wherein said steps of generating a pickoff signal and repetitively applying a constant magnitude force include the steps of:
applying equal charges to the first and second capacitors for first and second successive intervals of time to establish electric fields that exert a net force on the sensing member tending to return it to null position; and
sensing the voltages associated with said charged capacitors to provide said pickoff signal.

14. The method of claim 13 including the step of employing said pickoff signal to control the relative lengths of said first and second successive time intervals.

15. A force balanced instrument comprising:
a sensing member mounted for movement in response to an input to be measured;
first and second electrostatic plates mounted on opposite sides of said sensing member and cooperating with said sensing member to form first and second capacitors having first and second gaps, respectively, that vary as said sensing member moves in response to an input thereto;
means for applying equal charges to said first and second capacitors for first and second successive time intervals to produce first and second voltages on said capacitors respectively; and
means for generating a pickoff signal indicative of the difference between said first and second voltages.

16. A force balanced instrument as set forth in claim 15 including means responsive to said pickoff signal for controlling the durations of respective ones of said time intervals.

17. The instrument of claim 16 wherein said first and second time intervals comprise first and second part cycles collectively forming a frame that is repeated, and wherein said means for varying durations comprise means for varying the relative lengths of said time intervals to vary the duty cycle of each frame in accordance with said pickoff signal.

18. The instrument of claim 16 wherein said means for generating a pickoff signal comprises means for sampling voltage on said first and second capacitors respectively during successive time intervals to provide first and second voltage samples, means for generating a difference signal indicative of the different between voltage samples, and means for integrating said difference signal over a plurality of said successive time intervals.

19. The instrument of claim 16 wherein said means for controlling durations of respective ones of said time intervals comprise pulse width modulator means having a variable duty cycle output and means for controlling said pulse width modulator means in response to said pickoff signal.

20. The instrument of claim 8, wherein said means for applying equal charges comprises:
an amplifier having an input and an output, said first and second capacitors being connected in respective ones of first and second feedback paths between said output and input;
means for applying a precision voltage pulse to the input of said integrator for a predetermined time;
first and second switch means connected in said first and second feedback paths for applying the output of said amplifier to charge said first and second capacitors alternately, and to cause said capacitors to apply an electrostatic force to said sensing member for first and second successive time intervals; and means for actuating said first and second switch means alternately for first and second successive time intervals.

21. The instrument of claim 20 including means for discharging both said capacitors during each of said successive time periods and before said capacitors are charged.

22. The instrument of claim 16, wherein said means responsive to said pickoff signal comprises:

an integrator having an input connecting to said pickoff signal and having an output; and a pulse width modulator having a variable duty cycle output and having an input from the output of said integrator, said variable duty cycle output providing the relative durations of said first and second successive time intervals.

23. The instrument of claim 15 including means for relatively varying durations of said first and second intervals.

24. The instrument of claim 15, wherein said means for applying equal charges comprises:

an amplifier having an input and an output, said first and second capacitors being connected in respective ones of first and second feedback paths between said output and input;

means for applying a series of precision voltage pulses of alternately opposite polarity to the input of said amplifier;

first and second unidirectionally conductive devices connected in said first and second feedback paths respectively;

first and second sample and hold circuits connected respectively to said first and second capacitors.

25. The instrument of claim 24, wherein said means for generating a pickoff signal comprises:

a summing amplifier for summing signals contained in said sample and hold circuits;

means responsive to said summing circuit for controlling the relative durations of said first and second successive time intervals; and means for discharging said first and second capacitors at the end of said first and second successive time intervals.

26. The instrument of claim 15, wherein said means for applying equal charges comprises:

an amplifier having an input and an output, said first and second capacitors being connected in respective ones of first and second feedback paths between said output and input;

means for applying a precision voltage pulse to the input of said amplifier;

first and second switch means connecting to ground said first and second capacitors for said first and second successive time intervals; and means for actuating said first and second switch means alternately for said first and second successive time intervals.

27. The instrument of claim 26, wherein said means for generating a pickoff signal comprises:

first and second sample storage means;

means for transferring the voltage on respective ones of said capacitors to respective ones of said storage means;

a difference circuit having an input connected to said first and second storage means and having an output;

an integrator having an input connected to the output of said difference circuit and having an output; and a pulse width modulator having a variable duty cycle output and having an input from the output of said integrator.

28. The instrument of claim 27, further comprising:

means responsive to said variable duty cycle output for controlling the relative durations of said first and second successive time intervals.

29. The instrument of claim 15 wherein said means for applying equal charges comprises means for applying charges of equal magnitude and mutually opposite polarity to said first and second capacitors respectively.

30. The instrument of claim 15 wherein said means for applying equal charges comprises means for applying charges of equal magnitude and like polarity.

31. The instrument of claim 15 wherein said means for applying equal charges includes means for alternately grounding said first and second capacitors during said first and second time intervals.

32. The instrument of claim 15, wherein said means for generating a pickoff signal comprise:

first and second sample storage means;

means for transferring the voltages on said first and second capacitors to said first and second storage means respectively during respective ones of said first and second successive time intervals; and a difference circuit having an input connected to said first and second storage means and having an output, said output comprising said pickoff signal.

* * * * *